US012170048B2

(12) United States Patent
Sun et al.

(10) Patent No.: US 12,170,048 B2
(45) Date of Patent: Dec. 17, 2024

(54) BRIGHTNESS REGULATING METHOD, REGULATING SYSTEM AND DISPLAYING DEVICE

(71) Applicants: CHONGQING BOE OPTOELECTRONICS TECHNOLOGY CO., LTD., Chongqing (CN); BOE Technology Group Co., Ltd., Beijing (CN)

(72) Inventors: Hao Sun, Beijing (CN); Jin Sha, Beijing (CN); Bo Xu, Beijing (CN); Yang Chen, Beijing (CN); Qiang Chen, Beijing (CN); Meilong Hu, Beijing (CN); Zhi Zhang, Beijing (CN); Wencheng Luo, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/795,716

(22) PCT Filed: Sep. 29, 2021

(86) PCT No.: PCT/CN2021/121814
§ 371 (c)(1),
(2) Date: Jul. 27, 2022

(87) PCT Pub. No.: WO2023/050189
PCT Pub. Date: Apr. 6, 2023

(65) Prior Publication Data
US 2024/0185755 A1 Jun. 6, 2024

(51) Int. Cl.
*G09G 3/20* (2006.01)
*G09G 3/34* (2006.01)

(52) U.S. Cl.
CPC ......... *G09G 3/2007* (2013.01); *G09G 3/3406* (2013.01); *G09G 2320/0626* (2013.01); *G09G 2360/16* (2013.01)

(58) Field of Classification Search
CPC .................................................... G09G 3/2007
See application file for complete search history.

(56) References Cited

U.S. PATENT DOCUMENTS

2008/0100645 A1* 5/2008 Nitta .................... G09G 3/3426 345/690
2010/0079476 A1* 4/2010 Baba .................... G09G 3/3406 345/589

(Continued)

FOREIGN PATENT DOCUMENTS

CN 105047145 A 11/2015
CN 106328071 A 1/2017

(Continued)

*Primary Examiner* — William Boddie
*Assistant Examiner* — Andrew B Schnirel
(74) *Attorney, Agent, or Firm* — WHDA, LLP

(57) ABSTRACT

The present disclosure provides a brightness regulating method, a regulating system and a displaying device. The method is applied to a displaying device. The displaying device includes a backlight module. The regulating method includes acquiring maximum grayscale values of the light areas and a maximum grayscale value of the backlight source; according to the maximum grayscale values of the light areas and the maximum grayscale value of the backlight source, obtaining a plurality of first brightness parameters; according to the plurality of first brightness parameters, obtaining a second brightness parameter; and subsequently, according to the second brightness parameter (Continued)

and the initial brightnesses of the light areas, regulating brightnesses of the light areas.

18 Claims, 6 Drawing Sheets

(56) References Cited

U.S. PATENT DOCUMENTS

| | | | | |
|---|---|---|---|---|
| 2015/0269895 | A1* | 9/2015 | Kao | G09G 3/3426 345/690 |
| 2016/0322006 | A1* | 11/2016 | Chen | G09G 3/3426 |
| 2018/0061310 | A1 | 3/2018 | Sako et al. | |
| 2019/0206335 | A1 | 7/2019 | Wu | |

FOREIGN PATENT DOCUMENTS

| | | | |
|---|---|---|---|
| CN | 107909970 | A | 4/2018 |
| CN | 111599320 | A | 8/2020 |
| JP | 2017-106991 | A | 6/2017 |
| WO | 2014/002712 | A1 | 1/2014 |

* cited by examiner

BRIGHTNESS REGULATING METHOD, REGULATING SYSTEM AND DISPLAYING DEVICE

TECHNICAL FIELD

The present disclosure relates to the technical field of displaying, and particularly relates to a brightness regulating method, a regulating system and a displaying device.

BACKGROUND

With the rapid development of the technique of displaying, the industry is having increasingly higher requirements on the performance of the backlight sources of display products. Regarding display products fabricated by using a backlight source having the function of local light regulation, when some of the local areas of the backlight source are lightened and the other areas are extinguished, display products of a low contrast very easily have a halo surrounding the lightened area, which reduces the effect of displaying of the display products.

SUMMARY

The embodiments of the present disclosure employ the following technical solutions:

In an aspect, an embodiment of the present disclosure provides a brightness regulating method, wherein the method is applied to a displaying device, the displaying device includes a backlight module, and the brightness regulating method includes:

- dividing a backlight source of the backlight module into a plurality of light areas;
- acquiring maximum grayscale values of the light areas and a maximum grayscale value of the backlight source;
- according to the maximum grayscale values of the light areas and the maximum grayscale value of the backlight source, obtaining first brightness parameters of the light areas;
- according to the first brightness parameters, obtaining a second brightness parameter; and
- according to the second brightness parameter, regulating brightnesses of the light areas.

In some embodiments of the present disclosure, the step of, according to the second brightness parameter, regulating the brightnesses of the light areas includes:

- when a light area among the light areas is in a lightening state, renewing a brightness value of the light area, wherein the brightness value that has been renewed is equal to a product of multiplying an initial brightness value of the light area in the lightening state by the second brightness parameter; and
- when a light area among the light areas is in an extinguishing state, maintaining the extinguishing state of the light area.

In some embodiments of the present disclosure, the step of, according to the maximum grayscale values of the light areas and the maximum grayscale value of the backlight source, obtaining the first brightness parameters of the light areas includes:

- dividing the maximum grayscale values of the light areas by the maximum grayscale value of the backlight source, to obtain a plurality of the first brightness parameters of a quantity equal to a quantity of the light areas.

In some embodiments of the present disclosure, the step of, according to the first brightness parameters, obtaining the second brightness parameter includes:

- solving an average value of the first brightness parameters, to obtain the second brightness parameter.

In some embodiments of the present disclosure, after the step of dividing the backlight source into the plurality of light areas, and before the step of acquiring the maximum grayscale values of the light areas and the maximum grayscale value of the backlight source, the method further includes:

- determining a third brightness parameter of the light areas; and
- when the third brightness parameter exceeds a preset value, regulating the brightnesses of the light areas.

In some embodiments of the present disclosure, the step of determining the third brightness parameter of the light areas includes:

- acquiring the maximum grayscale values of the light areas and the maximum grayscale value of the backlight source;
- according to the maximum grayscale values of the light areas, obtaining an average value of the maximum grayscale values of the light areas; and
- according to the average value of the maximum grayscale values of the light areas and the maximum grayscale value of the backlight source, determining the third brightness parameter.

In some embodiments of the present disclosure, the preset value is less than or equal to 30%.

In some embodiments of the present disclosure, the displaying device further includes a display panel, and the display panel is located on a light exiting side of the backlight module; and after the step of, according to the second brightness parameter, regulating the brightnesses of the light areas, the method further includes:

- according to the light areas in a lightening state, determining a compensation area of the display panel;
- determining a compensating parameter of the compensation area; and
- according to the compensating parameter, performing brightness regulation to the compensation area.

In some embodiments of the present disclosure, the step of, according to the light areas in the lightening state, determining the compensation area includes:

- determining a displayed frame in the display panel corresponding to the light areas in the lightening state;
- according to frame pixels in the displayed frame, determining edge pixels;
- determining a quantity of the frame pixels; and
- according to the quantity of the frame pixels, determining a compensation area of the edge pixels, wherein the compensation area refers to an area where some of pixels other than the frame pixels among pixels corresponding to the light areas in the lightening state are located.

In some embodiments of the present disclosure, the step of determining the compensating parameter of the compensation area includes:

- determining a pixel quantity of the compensation area;
- when the pixel quantity of the compensation area is less than a quantity of brightness-compensation ranks, determining the compensating parameter of the compensation area to be a zero grayscale; and
- when the pixel quantity of the compensation area is greater than or equal to the quantity of the brightness-compensation ranks, dividing the compensation area into a plurality of compensating sub-areas, wherein a quantity of the compensating sub-areas is equal to the quantity of the brightness-compensation ranks;

wherein pixels in a same compensating sub-area correspond to a same brightness-compensation rank, the compensating parameters in a same brightness-compensation rank are equal, and the compensating parameters in the brightness-compensation ranks are greater than or equal to a zero grayscale, and less than pixel grayscales of the edge pixels.

In some embodiments of the present disclosure, compensating parameters of the compensating sub-areas gradually decrease in a first direction, wherein the first direction refers to a direction from an area where the frame pixels are located to the compensation area.

In another aspect, an embodiment of the present disclosure provides a brightness regulating system, wherein the brightness regulating system includes: a controller and a backlight module that are electrically connected;

the backlight module is configured for providing a backlight source under controlling by the controller;

the controller includes an area dividing and light regulating unit and a controlling unit;

the controlling unit and the area dividing and light regulating unit are electrically connected, and the area dividing and light regulating unit and the backlight module are electrically connected;

the area dividing and light regulating unit is configured for, when an area-delimitation controlling signal emitted by the controlling unit has been received, according to the area-delimitation controlling signal, dividing the backlight source into a plurality of light areas;

the controlling unit is configured for acquiring and storing maximum grayscale values of the light areas and a maximum grayscale value of the backlight source; according to the maximum grayscale values of the light areas and the maximum grayscale value of the backlight source, obtaining first brightness parameters corresponding to the light areas; according to the first brightness parameters, obtaining a second brightness parameter; and emitting the area-delimitation controlling signal and a light regulating signal; and the area dividing and light regulating unit is further configured for, after the light regulating signal has been received, acquiring the second brightness parameter, and according to the second brightness parameter, regulating brightnesses of the light areas.

In some embodiments of the present disclosure, the area dividing and light regulating unit includes an area dividing subunit and a light regulating subunit;

the area dividing subunit is configured for, according to the area-delimitation controlling signal, dividing the backlight source into a plurality of light areas; and the light regulating subunit is configured for acquiring the second brightness parameter; if a light area among the light areas is in a lightening state, renewing a brightness value of the light area according to the second brightness parameter, wherein the brightness value that has been renewed is equal to a product of multiplying an initial brightness value of the light area in the lightening state by the second brightness parameter; and if a light area among the light areas is in an extinguishing state, controlling the light area to maintain the extinguishing state.

In some embodiments of the present disclosure, the controlling unit includes a storing subunit, an acquiring subunit, a first calculating subunit and a second calculating subunit;

the acquiring subunit is configured for acquiring the maximum grayscale values of the light areas and the maximum grayscale value of the backlight source;

the storing subunit is configured for storing the area-delimitation controlling signal, the light regulating signal, the maximum grayscale values of the light areas, the maximum grayscale value of the backlight source, the first brightness parameter and the second brightness parameter, and emitting the area-delimitation controlling signal and the light regulating signal;

the first calculating subunit is configured for dividing the maximum grayscale values of the light areas by the maximum grayscale value of the backlight source, to obtain a plurality of the first brightness parameters of a quantity equal to a quantity of the light areas; and the second calculating subunit is configured for solving an average value of the first brightness parameters, to obtain the second brightness parameter.

In some embodiments of the present disclosure, the controlling unit further includes a determining submodule;

the determining submodule is configured for determining a third brightness parameter of the light areas, and determining whether the third brightness parameter exceeds a preset value; and when the third brightness parameter exceeds the preset value, the determining submodule triggers the storing submodule to emit the light regulating signal, wherein the third brightness parameter refers to a ratio of an average value of the maximum grayscale values of the light areas to the maximum grayscale value of the backlight source.

In some embodiments of the present disclosure, the preset value is less than or equal to 30%.

In some embodiments of the present disclosure, the system further includes a display panel, the display panel is located on a light exiting side of the backlight module, and the display panel is electrically connected to the controlling unit;

the controller further includes a color compensating unit, and the color compensating unit is electrically connected to the controlling unit;

the color compensating unit is configured for:

according to the light areas in a lightening state, determining a compensation area of the display panel; and determining a compensating parameter of the compensation area; and the controlling unit is further configured for, according to the compensating parameter, performing brightness regulation to the compensation area.

In some embodiments of the present disclosure, the color compensating unit includes a first determining subunit and a second determining subunit;

the first determining subunit is configured for determining a displayed frame in the display panel corresponding to the light areas in the lightening state; according to frame pixels in the displayed frame, determining edge pixels; determining a quantity of the frame pixels; and according to the quantity of the frame pixels, determining a compensation area of the edge pixels, wherein the compensation area refers to an area where some of pixels other than the frame pixels among pixels corresponding to the light areas in the lightening state are located; and the second determining subunit is configured for determining a pixel quantity of the compensation area; if the pixel quantity of the compensation area is less than a quantity of brightness-compensation ranks, determining the compensating parameter of the compensation area to be a zero grayscale; and if the pixel quantity of the compensation area is greater than or equal to the quantity of the brightness-compensation ranks, dividing the compensation area into a plurality of compensating sub-areas, wherein a quantity of the compensating sub-areas is equal to the quantity of the brightness-compensation ranks;

wherein pixels in a same compensating sub-area correspond to a same brightness-compensation rank, the compensating parameters in a same brightness-compensation rank are equal, and the compensating parameters in the brightness-compensation ranks are greater than or equal to a zero grayscale, and less than pixel grayscales of the edge pixels.

In some embodiments of the present disclosure, compensating parameters of the compensating sub-areas gradually decrease in a first direction, wherein the first direction refers to a direction from an area where the frame pixels are located to the compensation area.

In yet another aspect, an embodiment of the present disclosure provides a displaying device, wherein the displaying device includes the system stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are merely embodiments of the present disclosure, and a person skilled in the art can obtain other figures according to these figures without paying creative work.

DETAILED DESCRIPTION

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Unless stated otherwise in the context, throughout the description and the claims, the term “comprise” is interpreted as the meaning of opened containing, i.e., “including but not limited to”. In the description of the present disclosure, the terms “one embodiment”, “some embodiments”, “exemplary embodiments”, “example”, “specific example” or “some examples” are intended to indicate that specific features, structures, materials or characteristics related to the embodiment or example are comprised in at least one embodiment or example of the present application. The illustrative indication of the above terms does not necessarily refer to the same one embodiment or example. Moreover, the specific features, structures, materials or characteristics may be comprised in any one or more embodiments or examples in any suitable manner.

In the embodiments of the present disclosure, terms such as “first” and “second” are used to distinguish identical items or similar items that have substantially the same functions and effects, merely in order to clearly describe the technical solutions of the embodiments of the present disclosure, and should not be construed as indicating or implying the degrees of importance or implicitly indicating the quantity of the specified technical features.

In the related art, regarding displaying devices of a low contrast having the function of local light regulation, when some of the local areas of the displayed frame are lightened and the other areas are extinguished, because some of the light rays of the lightened area can leak via the extinguished area, a “halo” phenomenon emerges, wherein the halo surrounds the lightened area. The “halo” highly reduces the effect of displaying of the displaying device. It should be noted that the function of local light regulation is realized by controlling the backlight source in delimited areas.

Figure 1A:
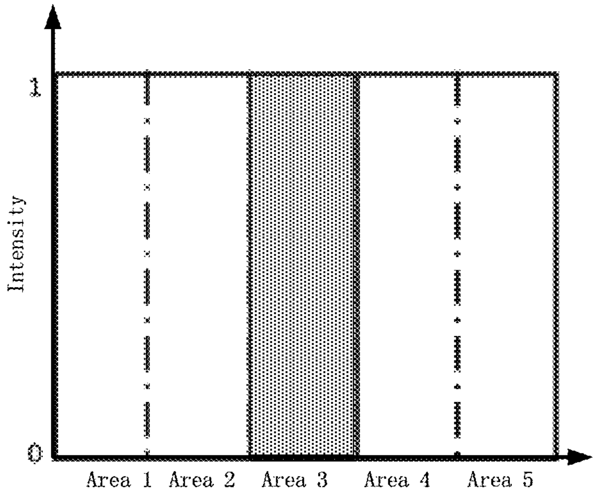
FIG. 1*a* and FIG. 1*b* are schematic diagrams of the explanation on the principle of the generation of the halo according to an embodiment of the present disclosure.
Figure 1B:
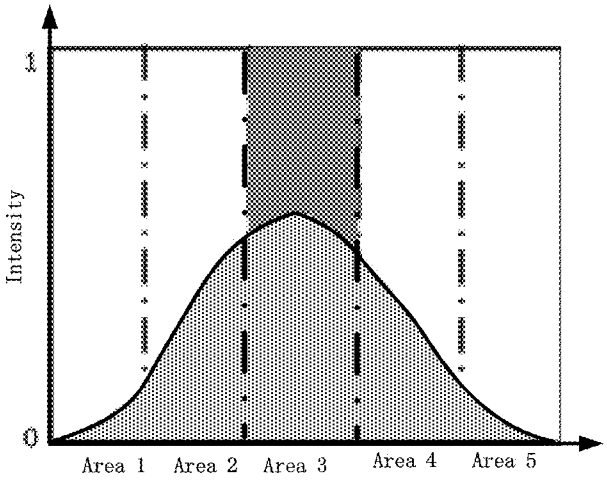

Regarding a displaying device having the function of local light regulation, the displaying device includes a backlight module and a display panel. If the backlight source of the backlight module is delimited into five areas, those five areas may be controlled individually. When the third area (Area3) of the backlight source is lightened and the other areas are extinguished, in an ideal situation, referring to FIG. 1*a*, the light intensity measured at the position of the display panel corresponding to the third area (Area3) is 1, and the light intensities measured at the other areas are 0. However, in practical applications, because the display panel has the light leakage, referring to FIG. 1*b*, the light intensity at the position of the display panel corresponding to the third area (Area3) is weakened, and the positions of the display panel corresponding to the other areas adjacent to the third area (Area3) present a certain brightness. When the displaying device has a low average brightness, the halo is presented which gradually diffuses to the periphery with the third area (Area3) as the center, which reduces the effect of displaying. In FIGS. 1*a* and 1*b*, the horizontal coordinate is the different areas corresponding to the backlight source, and the vertical coordinate is the light intensity (Intensity).

It should be noted that the condition in which the displaying device has a low average brightness includes the case in which some of the areas in the displayed frame are a white frame and most of the areas are a black frame, in which case the "halo" phenomenon is more obvious.

Currently, two methods for alleviating the "halo" phenomenon exist in the related art. The first method is improving the design of the displaying device to increase the contrast of the displaying device, thereby reducing the light leakage of the extinguished area, to reach the effect of alleviating the "halo" phenomenon. The second method is reducing the sizes of the delimited areas of the backlight source and increasing the quantity of the delimited areas of the backlight source, so as to, by controlling the backlights in the delimited areas, reduce the difference in the brightness between the delimited backlight areas corresponding to the white frame and the delimited backlight areas corresponding to the adjacent black frame, thereby alleviating the "halo" phenomenon. However, the ameliorating methods in the related art have a high technical difficulty, and have a high cost.

Figure 2:
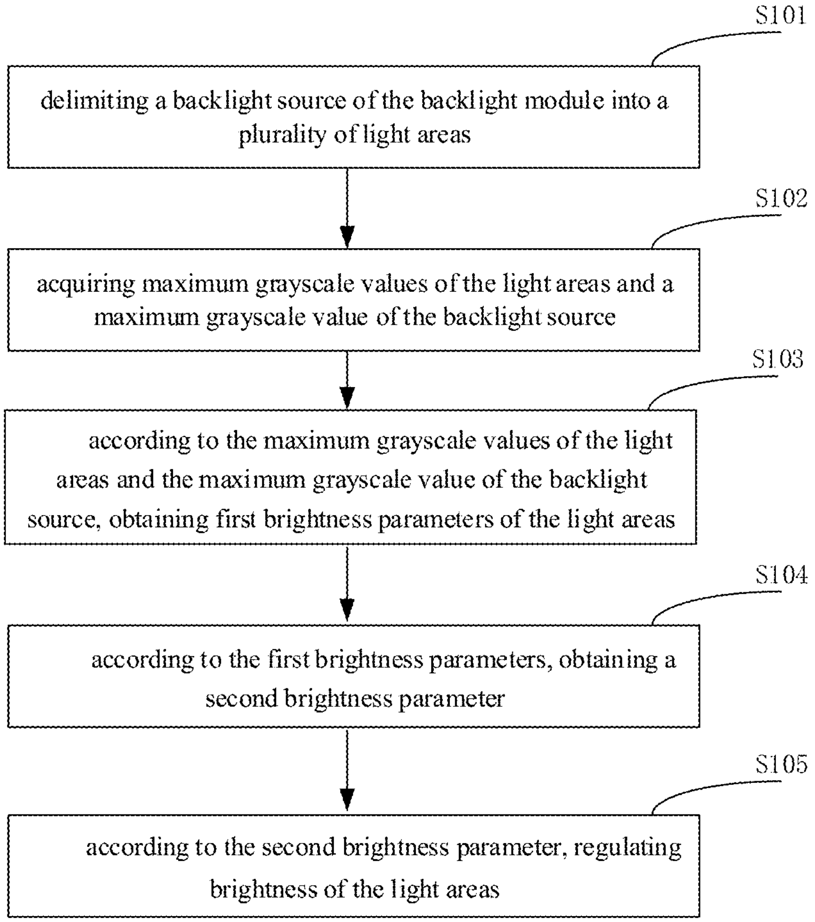
FIG. 2 is a flow chart of the brightness regulating method according to an embodiment of the present disclosure.

In view of that, an embodiment of the present disclosure provides a brightness regulating method, wherein the method is applied to a displaying device, the displaying device includes a backlight module, and, referring to FIG. 2, the regulating method includes:

S101: dividing a backlight source of the backlight module into a plurality of light areas.

As an example, the backlight source may be delimited into 9 light areas, 16 light areas or 25 light areas. The state of each of the light areas obtained after the area division can be separately controlled, for example, solely controlling one of the light areas to be in a lightening state or an extinguishing state. The brightnesses of them can also be separately controlled, for example, solely controlling one of the light areas, to increase or reduce its brightness.

Figure 3A:
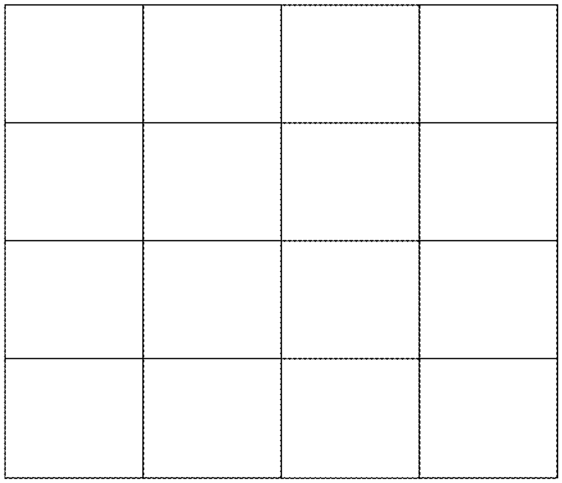
FIG. 3*a* is a schematic diagram of the arrangement of the light areas of the backlight source according to an embodiment of the present disclosure.

FIG. 3*a* shows a schematic diagram of dividing the backlight source of the backlight module into 16 light areas, wherein each of the blocks in FIG. 3*a* represents one light area.

The type of the backlight module is not limited herein. In some embodiments, the backlight module may be an LED (Light Emitting Diode) backlight module, and may also be a Mini LED (Mini Light Emitting Diode) backlight module.

As an example, each of the light areas may contain at least one LED light, or contain at least one Mini LED light.

In some embodiments, the Mini LED backlight module may be an AM Mini LED (Active Matrix Mini Light Emitting Diode) backlight module. Alternatively, the Mini LED backlight module may be a PM Mini LED (Passive Matrix Mini Light Emitting Diode) backlight module.

S102: acquiring maximum grayscale values of the light areas and a maximum grayscale value of the backlight source.

Figure 3B:
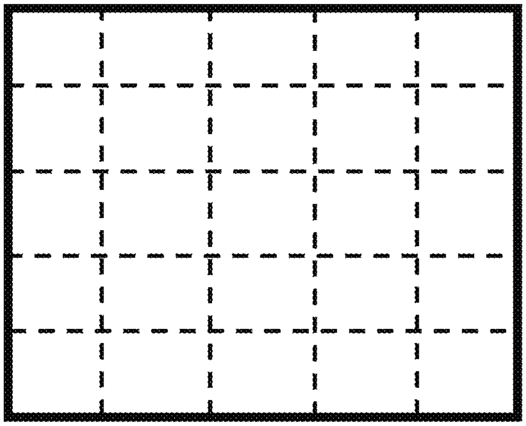
FIG. 3*b* is a schematic diagram of the pixel arrangement in the pixel area corresponding to one of the light areas in FIG. 3*a;*

FIG. 3*b* shows a schematic diagram of the pixel arrangement in the pixel area corresponding to one of the light areas in FIG. 3*a*. As an example, the pixel area corresponding to one of the light areas contains pixels arranged as 5*5, as shown in FIG. 3*b*.

The maximum grayscale value of a light area refers to the maximum pixel-grayscale value in the pixel area corresponding to the light area. The maximum grayscale value of the backlight source refers to the maximum pixel-grayscale value in the pixel areas corresponding to all of the light areas of the backlight source.

In practical applications, the pixel-grayscale values may be acquired by using a time schedule controller (TCON).

S103: according to the maximum grayscale values of the light areas and the maximum grayscale value of the backlight source, obtaining first brightness parameters corresponding to the light areas.

The first brightness parameter is decided by the maximum grayscale values of the light areas and the maximum grayscale value of the backlight source, and each of the light areas corresponds to one first brightness parameter.

S104: according to the first brightness parameters, obtaining a second brightness parameter.

The second brightness parameter is decided jointly by all of the first brightness parameters. In the process of one time of the brightness regulation on the backlight module, the backlight module corresponds to merely one second brightness parameter. It can be understood that the second brightness parameters corresponding to all of the light areas are equal.

S105: according to the second brightness parameter, regulating brightnesses of the light areas.

It should be noted that the process of the brightness regulation on each of the light areas is decided jointly by the initial brightnesses of the light areas and the second brightness parameter. Particularly, regarding a light area whose initial state is the extinguishing state, after the brightness regulation, the light area is still in the extinguishing state. Regarding a light area whose initial state is the lightening state, the brightness of the light area after the regulation is decided jointly by its initial brightness and the second brightness parameter.

In an embodiment of the present disclosure, although the brightness regulation involves acquiring the maximum pixel-grayscale values in the pixel areas corresponding to the light areas, finally it is still brightness regulation on the light areas of the backlight source. In the regulation on the brightnesses of the light areas, taking the Mini LED backlight module as an example, the brightnesses are regulated particularly by regulating the anode voltages corresponding to the Mini LED light emitting chips.

The regulating method according to the embodiments of the present disclosure includes acquiring maximum grayscale values of the light areas and a maximum grayscale value of the backlight source; according to the maximum grayscale values of the light areas and the maximum grayscale value of the backlight source, obtaining a plurality of first brightness parameters; according to the plurality of first brightness parameters, obtaining a second brightness parameter; and subsequently, according to the second brightness parameter and the initial brightnesses of the light areas, regulating brightnesses of the light areas, to reduce the difference in the brightnesses of the pixel areas corresponding to the light areas in the lightening state and the pixel areas corresponding to the light areas in the extinguishing state, which can alleviate the problem of "halo" caused by light leakage of the display panel, and in turn can improve the effect of displaying of the displaying device fabricated by using the backlight module.

In some embodiments of the present disclosure, the step S105 of, according to the second brightness parameter, regulating the brightnesses of the light areas includes:

S1051: when a light area among the light areas is in a lightening state, renewing a brightness value of the light area, wherein the brightness value that has been renewed is equal to a product of multiplying an initial brightness value of the light area in the lightening state by the second brightness parameter.

The initial brightness of the light area in the lightening state may be an actually measured brightness value, and may also be the pixel-grayscale value corresponding to the brightness.

The second brightness parameter is a dimensionless regulating parameter. The second brightness parameter is decided by the plurality of first brightness parameters. The second brightness parameter is greater than 0 and less than 1.

S1052: when a light area among the light areas is in an extinguishing state, maintaining the extinguishing state of the light area.

In some embodiments of the present disclosure, the step S103 of, according to the maximum grayscale values of the light areas and the maximum grayscale value of the backlight source, obtaining the first brightness parameters of the light areas includes:

S1031: dividing the maximum grayscale values of the light areas by the maximum grayscale value of the backlight source, to obtain a plurality of the first brightness parameters of a quantity equal to a quantity of the light areas.

The first brightness parameter is a dimensionless regulating parameter. It can be understood that the first brightness parameter is a ratio of the maximum grayscale value of the light area to the maximum grayscale value of the backlight source.

The first brightness parameter is greater than or equal to 0 and less than or equal to 1. When a light area is in the extinguishing state, the maximum grayscale value of the light area is 0, and the first brightness parameter corresponding to the light area is equal to 0. When the maximum grayscale value of the light area is equal to the maximum grayscale value of the backlight source, the first brightness parameter corresponding to the light area is equal to 1.

In some embodiments of the present disclosure, the step S104 of, according to the first brightness parameters, obtaining the second brightness parameter includes:

S1041: solving an average value of the first brightness parameters, to obtain the second brightness parameter.

Because the first brightness parameter is a dimensionless regulating parameter, and the second brightness parameter is the average value of the first brightness parameters of the light areas, the second brightness parameter is also a dimensionless regulating parameter.

The first brightness parameter is greater than or equal to 0 and less than or equal to 1. The regulating method according to the present disclosure aims at ameliorating the problem of the halo emerging in the pixel areas corresponding to the light areas when some of the light areas are lightened and some of the light areas are extinguished, and when all of the light areas are lightened or all of the light areas are extinguished, there is not the problem of halo. Therefore, the case does not exist in which all of the first brightness parameters of the light areas are 0, and the case does not exist in which all of the first brightness parameters of the light areas are 1. Therefore, it can be determined that the second brightness parameter is greater than 0 and less than 1.

In some embodiments of the present disclosure, after the step S101 of dividing the backlight source into the plurality of light areas, and before the step S102 of acquiring the maximum grayscale values of the light areas and the maximum grayscale value of the backlight source, the method further includes:

S106: determining a third brightness parameter of the light areas.

S107: when the third brightness parameter exceeds a preset value, regulating the brightnesses of the light areas.

The third brightness parameter is a parameter for measuring the overall brightness of all of the light areas. If the third brightness parameter exceeds a preset value, by using the above brightness regulating method, the brightnesses of the light areas in the lightening state are regulated.

In some embodiments of the present disclosure, the preset value is less than or equal to 30%.

As an example, the preset value may be 30%, or the preset value may be 25%.

It should be noted that, when the overall brightness of all of the light areas is high, the overall brightness of the pixel areas corresponding to the light areas is high, in which case the "halo" phenomenon in the pixel areas corresponding to the light areas in the extinguishing state cannot be perceived by human eyes, and its affection on the effect of displaying of the displaying device is nearly negligible. When the overall brightness of all of the light areas is low, the overall brightness of the pixel areas corresponding to the light areas is low, in which case the "halo" phenomenon in the pixel areas corresponding to the light areas in the extinguishing state is more significant, and is more easily perceived by human eyes. Therefore, the brightness regulating method according to the embodiments of the present disclosure mainly aims at the case in which the overall brightness of all of the light areas is low.

In addition, it can be understood that the "halo" phenomenon is an influence by the light areas in the lightening state on the pixel areas corresponding to the light areas in the extinguishing state, and the positions where the "halo" phenomenon is significant are located in the pixel areas corresponding to the light areas in the extinguishing state. The brightness regulating method according to the embodiments of the present disclosure, by regulating the brightnesses of the light areas in the lightening state in the backlight module, alleviates the affection by the light areas in the lightening state on the pixel areas corresponding to the light areas in the extinguishing state, and in turn alleviates the "halo" phenomenon in the pixel areas corresponding to the light areas in the extinguishing state.

In some embodiments of the present disclosure, the step S106 of determining the third brightness parameter of the light areas includes:

S1061: acquiring the maximum grayscale values of the light areas and the maximum grayscale value of the backlight source.

The maximum grayscale value of a light area refers to the maximum pixel-grayscale value in the pixel area corresponding to each light area. The maximum grayscale value of the backlight source refers to the maximum pixel-grayscale value in the pixel areas corresponding to all of the light areas of the backlight source.

S1062: according to the maximum grayscale values of the light areas, obtaining an average value of the maximum grayscale values of the light areas.

S1063: according to the average value of the maximum grayscale values of the light areas and the maximum grayscale value of the backlight source, determining the third brightness parameter.

The average value of the maximum grayscale values of the light areas may represent the average brightness of the backlight source of the backlight module. The maximum grayscale value of the backlight source may represent the maximum brightness of the backlight source of the backlight module. By dividing the average value of the maximum grayscale values of the light areas by the maximum grayscale value of the backlight source, the obtained ratio is used to determine whether the brightnesses of the light areas are required to be regulated.

As an example, when the ratio is greater than a preset value, brightness regulation is not performed. When the ratio is less than or equal to the preset value, the brightnesses of the light areas are regulated by using the brightness regulating method according to the embodiments of the present disclosure.

In some embodiments of the present disclosure, the preset value is less than or equal to 30%.

As an example, the preset value may be 30%, or the preset value may be 25%.

It should be noted that, when the overall brightness of all of the light areas is high, the overall brightness of the pixel areas corresponding to the light areas is high, in which case the "halo" phenomenon in the pixel areas corresponding to the light areas in the extinguishing state cannot be perceived by human eyes, and its affection on the effect of displaying of the displaying device is nearly negligible. When the overall brightness of all of the light areas is low, the overall brightness of the pixel areas corresponding to the light areas is low, in which case the "halo" phenomenon in the pixel areas corresponding to the light areas in the extinguishing state is more significant, and is more easily perceived by human eyes. Therefore, the brightness regulating method according to the embodiments of the present disclosure mainly aims at the case in which the overall brightness of all of the light areas is low.

Figure 4A:
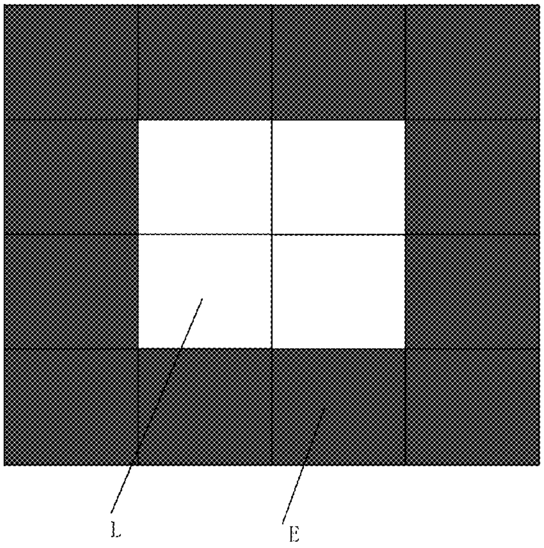
FIG. 4*a* is a schematic diagram of the state of the light areas of a backlight source according to an embodiment of the present disclosure.
Figure 4B:
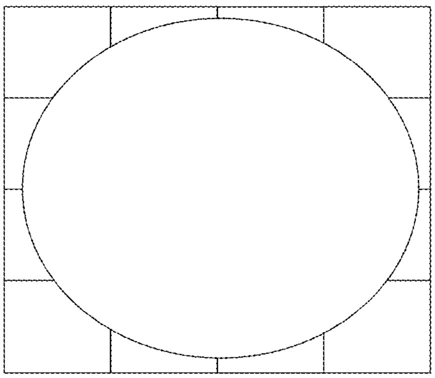
FIG. 4*b* is a schematic diagram of the halo phenomenon of the pixel areas corresponding to the light areas shown in FIG. 4*a;*

The particular process of ameliorating the problem of halo by using the brightness regulating method according to the present disclosure will be particularly described below by taking the backlight source including 4*4 light areas shown in FIG. 4*a* as an example. FIG. 4*a* is a schematic diagram of the light areas of the backlight source, wherein the part marked with E is the light areas in the extinguishing state, and the part marked with L is the light areas in the lightening state. FIG. 4*b* is the pixel areas corresponding to the light areas shown in FIG. 4*a*. The process particularly includes:

- dividing a backlight source of the backlight module into a plurality of light areas shown in FIG. 4*a;*
- acquiring the maximum grayscale values of the light areas and the maximum grayscale value of the backlight source shown in FIG. 4*a;*
- according to the maximum grayscale values of the light areas, obtaining the average value of the maximum grayscale values of the light areas;
- according to the average value of the maximum grayscale values of the light areas and the maximum grayscale value of the backlight source, determining the third brightness parameter; and
- if the third brightness parameter is less than a preset value, performing the subsequent steps.

The preset value may be set to be 30%.

Referring to FIG. 4*b*, it can be seen that, when the third brightness parameter is less than the preset value, the pixel areas shown in FIG. 4*b* present an obvious "halo" phenomenon, which seriously reduces the effect of displaying.

It should be noted that the "halo" phenomenon may be understood as a halo of the light rays from brightness to darkness that is presented with the pixel areas corresponding to the four lightened light areas as the center area, which is simply illustrated with the circle in FIG. 4*b*.

The pixel area corresponding to a light area refers to, in the display panel, a pixel area whose orthographic projection on the backlight module falls within the light area.

The process further includes: acquiring maximum grayscale values of the light areas and a maximum grayscale value of the backlight source; and dividing the maximum grayscale values of the light areas by the maximum grayscale value of the backlight source, to obtain a plurality of the first brightness parameters of a quantity equal to a quantity of the light areas.

It can be understood that the first brightness parameter is a ratio of the maximum grayscale value of the light area to the maximum grayscale value of the backlight source. The first brightness parameter is greater than or equal to 0 and less than or equal to 1. When a light area is in the extinguishing state, the maximum grayscale value of the light area is 0, and the first brightness parameter corresponding to the light area is equal to 0. When the maximum grayscale value of the light area is equal to the maximum grayscale value of the backlight source, the first brightness parameter corresponding to the light area is equal to 1.

The process further includes: solving an average value of the first brightness parameters, obtaining a second brightness parameter.

For example, in the 4*4 light areas shown in FIG. 4*a*, all of the first brightness parameters of the 4 light areas L in the lightening state are 40%, and all of the first brightness parameters of the 12 light areas L in the extinguishing state are 0%. Accordingly, the second brightness parameter is=(40%*4+0%*12)/16=10%.

The process further includes: regarding the 4 light areas in the lightening state, renewing their brightness values, wherein the brightness value that has been renewed is equal to a product of multiplying an initial brightness value of the light area in the lightening state by the second brightness parameter; and if a light area among the light areas is in an extinguishing state, maintaining the extinguishing state of the light area.

The brightness values that have been renewed are=the initial brightnesses*10%.

Figure 5A:
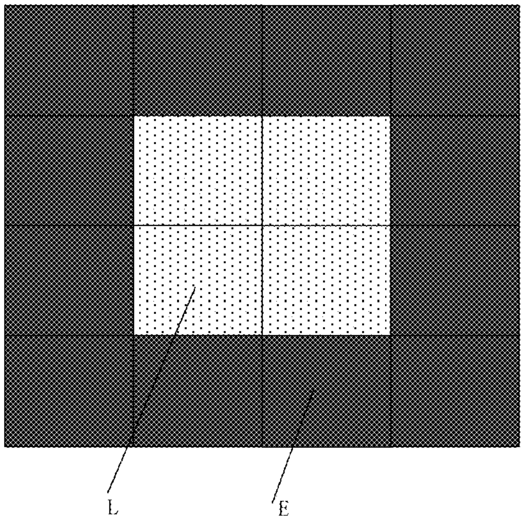
FIG. 5*a* is a schematic diagram of the state of the light areas of another backlight source according to an embodiment of the present disclosure.
Figure 5B:
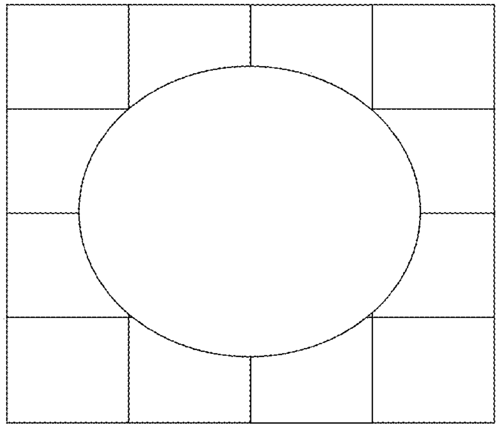
FIG. 5*b* is a schematic diagram of the effect of the halo amelioration of the pixel areas corresponding to the light areas shown in FIG. 5*a;*

By adjusting the brightnesses of the 4 light areas in the lightening state shown in FIGS. 4*a* to 10% of their initial brightnesses, the schematic diagram of the backlight source shown in FIG. 5*a* is obtained. FIG. 5*b* is the pixel areas corresponding to the light areas in FIG. 5*a*. According to FIG. 5*b*, it can be seen that, after the brightness adjustment on the light areas, the halo in their corresponding pixel areas has been obviously alleviated.

In some embodiments, if the backlight source is delimited into 1152 light areas, and the first brightness parameters corresponding to each delimited light area are A1, A2, A3, A4, A5, A6 . . . and A1152. then the second brightness parameter $\tilde{A}$ is=(A1+A2+A3+A4+A5+A6+ . . . +A1152)/1152. Regarding all of the light areas in the lightening state. the brightness values that have been renewed are=the initial brightnesses*$\tilde{A}$%.

Figure 6:
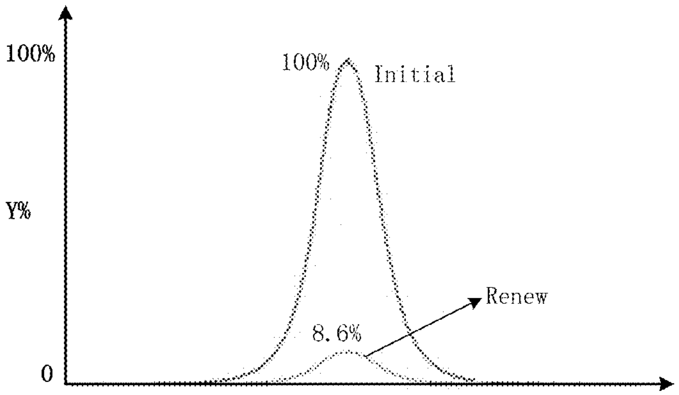
FIG. 6 is a diagram of the brightness tests of the light areas before and after the brightness regulation according to an embodiment of the present disclosure.

If merely one light area of the 1152 light areas is lightened, and all of the other light areas are in the extinguishing state, then the first brightness parameter corresponding to the lightened light area is 100%, and the second brightness parameter $\tilde{A}$ is=(100%+0*1152)/1152=8.68%. Regarding the one light area in the lightening state, the brightness value that has been renewed (Renew) is=the initial brightness (Initial)*8.68%. FIG. 6 illustrates the curves of the initial brightness of the light area and the brightness obtained after the regulation using the brightness regulating method according to the present disclosure, wherein the horizontal coordinate of the curves is the wavelength, and the vertical coordinate is the brightness.

In some embodiments of the present disclosure, the displaying device further includes a display panel, and the display panel is located on a light exiting side of the backlight module; and after the step S105 of, according to the second brightness parameter, regulating the brightnesses of the light areas, the method further includes:

S108: according to the light areas in a lightening state, determining a compensation area of the display panel.

The compensation area of the display panel refers to, according to the displayed frames corresponding to the light areas in the lightening state, determining the edge pixels of the frame pixels, and subsequently, according to the edge pixels, determining some of the pixels other than the frame pixels among the pixels corresponding to the light areas in the lightening state.

Figure 7A:
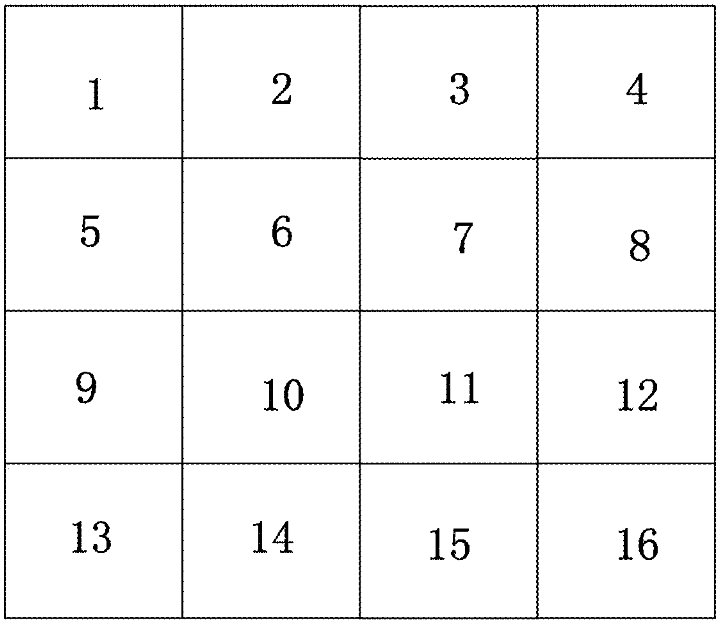
FIG. 7*a* is an arrangement of the light areas when the backlight source is delimited into 4*4 light areas according to an embodiment of the present disclosure.
Figure 7B:
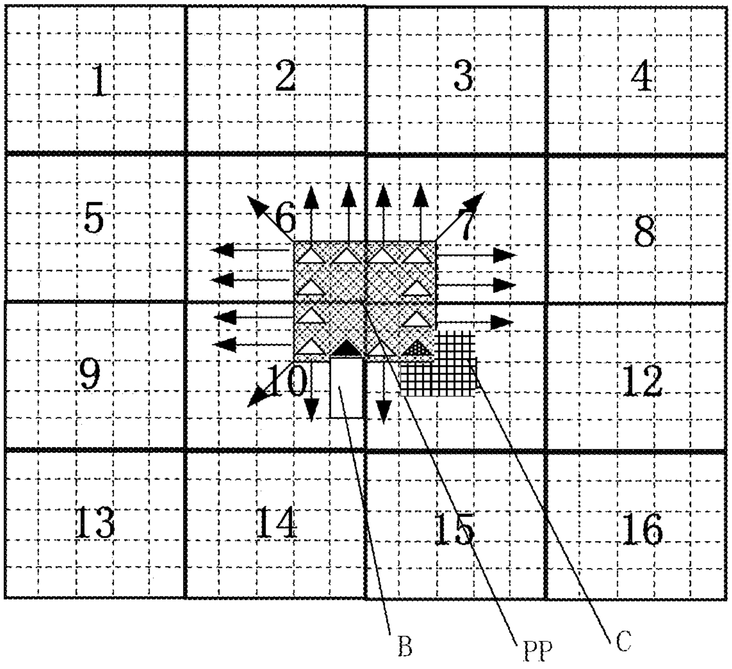
FIG. 7*b* is a schematic diagram of the pixel areas corresponding to the backlight source shown in FIG. 7*a;*

It should be noted that the frame pixels refer to the pixels that are being used to display the frames; in other words, when part of the area of the display panel is displaying a frame, and the remaining area is of a black state, the pixels located in the area that is displaying the frame may be referred to as the frame pixels. As an example, FIG. 7*a* shows the light-area arrangement when the backlight source is delimited into 4*4 light areas. FIG. 7*b* is the pixel areas corresponding to the backlight source shown in FIG. 7*a*, wherein the pixel area corresponding to each of the light areas contains 25 pixels. The area marked with PP in FIG. 7*b* is the area displaying the frame, wherein the pixels in the area are referred to as frame pixels.

The frame pixels include edge pixels. The edge pixels refer to the pixels that are at the black-white boundary and at the edge of the white area (the area displaying the frame), wherein the black-white boundary refers to the boundary between the area displaying the frame and the black-state area. Referring to FIG. 7*b*, the pixels among the frame pixels that are marked with "Δ", "◬" and "▲" are the edge pixels.

It can be understood that the compensation area refers to an area where some of the pixels other than the frame pixels in the pixel areas corresponding to the light areas in the lightening state are located. The orthographic projection of the area where the other pixels are located on the backlight module is located within the light area in the lightening state, and its orthographic projection on the backlight module and the orthographic projection of the frame pixels on the backlight module do not intersect or overlap with each other. In addition, the pixel area corresponding to a light area refers to, in the display panel, a pixel area whose orthographic projection on the backlight module falls within the light area.

S109: determining a compensating parameter of the compensation area.

The compensation area corresponding to one edge pixel includes at least one compensating parameter. Before the compensating parameter is determined, the compensation area is delimited into at least one compensating sub-area, wherein each of the compensating sub-areas corresponds to one compensating parameter. The compensating parameters of the compensating sub-areas are different, and the compensating parameters of the compensating sub-areas gradually decrease in a first direction, wherein the first direction refers to the direction from the area where the frame pixels are located to the compensation area.

When the compensation area includes merely one compensating sub-area, the compensating parameter of the compensating sub-area is a zero grayscale.

When the compensation area includes a plurality of compensating sub-areas, each of the compensating sub-areas corresponds to one brightness-compensation rank, each of the brightness-compensation ranks corresponds to one pixel-grayscale value, and all of the pixel-grayscale values corresponding to the brightness-compensation ranks are greater than or equal to a zero grayscale, and less than the grayscale values of the edge pixels corresponding to the compensation area.

The edge pixels refer to the pixels that are at the black-white boundary and at the edge of the white area, wherein the black-white boundary refers to the boundary between the area displaying the frame and the black-state area. Referring to FIG. 7*b*, the area marked with PP is the area displaying the frame, the area contains a plurality of frame pixels, the pixels among the frame pixels that are marked with "Δ", "◬" and "▲" are the edge pixels.

S110: according to the compensating parameter, performing brightness regulation to the compensation area.

The brightness regulating method according to the embodiments of the present disclosure can further include, according to the light areas in a lightening state, determining the compensation area, wherein the compensation area refers to an area where some of the pixels other than the frame pixels in the pixel areas corresponding to the light areas in the lightening state are located. By performing brightness regulation to different extents on the pixels in the compensation area, the method can further alleviate the halo phenomenon, improve the effect of displaying of the displaying device, and improve the image quality.

In some embodiments, the step S108 of, according to the light areas in a lightening state, determining a compensation area of the display panel includes:

S1081: determining a displayed frame in the display panel corresponding to the light areas in the lightening state.

As an example, FIG. 7*a* shows the light-area arrangement when the backlight source is delimited into 4*4 light areas. FIG. 7*b* is the pixel areas corresponding to the backlight source shown in FIG. 7*a*, wherein the pixel area corresponding to each of the light areas contains 25 pixels. The area marked with PP in FIG. 7*b* is the area displaying the frame, wherein the pixels in the area are referred to as frame pixels.

S1082: according to frame pixels in the displayed frame, determining edge pixels of the light areas.

The edge pixels refer to the pixels that are at the black-white boundary and at the edge of the white area, wherein the black-white boundary refers to the boundary between the area displaying the frame and the black-state area. Referring to FIG. 7*b*, the pixels among the frame pixels that are marked with "Δ", " ◭ " and "▲" are the edge pixels.

S1083: determining a quantity of the frame pixels.

The particular mode of determining the quantity of the frame pixels is not limited herein.

S1084: according to the quantity of the frame pixels, determining a compensation area of the edge pixels, wherein the compensation area refers to an area where some of pixels other than the frame pixels among pixels corresponding to the light areas in the lightening state are located.

It can be understood that the orthographic projection of the compensation area on the backlight module is located within the light areas in the lightening state, and the orthographic projection of the compensation area on the backlight module and the orthographic projection of the frame pixels on the backlight module do not intersect or overlap with each other.

Referring to FIG. 7*b*, because the displayed frame is located in the pixel areas corresponding to the light area 6, the light area 7, the light area 10 and the light area 11, the compensation areas are also located in the pixel areas corresponding to the light area 6, the light area 7, the light area 10 and the light area 11, and the pixels in the compensation areas do not include the frame pixels.

It should be noted that each of the edge pixels corresponds to one of the compensation areas, the compensation areas corresponding to all of the edge pixels among the frame pixels together form a buffer area, and the pixels in the buffer area surround the frame pixels.

In addition, the determination on the compensation areas further involves a dynamic parameter X, and the quantity of the pixels contained in each of the compensation areas may be determined jointly by the quantity of the frame pixels and the dynamic parameter X.

In some embodiments, the dynamic parameter X is related to the contrasts of displaying devices of different models. In practical applications, if the contrast is higher, the dynamic parameter X may be lower.

In some embodiments, the dynamic parameter X is related to the area of the outwardly extended area of the halo. If the area of the outwardly extended area of the halo is larger, the dynamic parameter X may be higher. It should be noted that, taking FIG. 5*b* as an example, the area of the outwardly extended area of the halo is obtained by subtracting the area of the pixel areas corresponding to the 4 light areas in the lightening state from the area of the elliptical halo, and the outwardly extended area of the halo is actually an approximately annular area.

It should be noted that, in practical applications, the brightness regulation on the compensation areas actually changes the pixel electrode voltages of the pixels in the compensation areas.

How to determine the compensation areas will be described below by using particular examples:

If the quantity of the frame pixels is 200, and the dynamic parameter X is set to be=20%, the quantity of the pixels contained in the compensation area corresponding to each of the edge pixels is=200*20%=40.

Referring to FIG. 7*b*, when the quantity of the frame pixels (the pixels in the area marked with PP in FIG. 7*b*) is 16, and the dynamic parameter X is set to be=12.5%, the quantity of the pixels contained in the compensation area corresponding to each of the edge pixels is=16*12.5%=2.

Regarding the edge pixels marked with "▲" in FIG. 7*b*, the area where their compensation areas is located is marked with B. When the quantity of the brightness-compensation energy levels is 5 or 6, because the quantity of the pixels of the compensation area B is less than the quantity of the brightness-compensation energy levels, the two pixels in the compensation area B may directly undergo a blackness-insertion processing.

When the dynamic parameter X is set to be=18.75%, the quantity of the pixels contained in the compensation area corresponding to each of the edge pixels is=16*18.75%=3. Regarding the edge pixels marked with " ◭ " in FIG. 7*b*, the area where their compensation areas is located is marked with C. When the quantity of the brightness-compensation energy levels is 5 or 6, because the quantity of the pixels of the compensation area C is less than the quantity of the brightness-compensation energy levels, the two pixels in the compensation area C may directly undergo a blackness-insertion processing.

The blackness-insertion processing may be understood as adjusting the grayscale of a pixel into an L0 grayscale.

The modes of determining the compensation areas of the other edge pixels are similar to that of that edge pixel. The compensation areas corresponding to all of the edge pixels together form a buffer area, and the pixels in the buffer area surround the frame pixels.

It should be noted that, in an embodiment of the present disclosure, the mode of the pixel arrangement in the compensation areas or the mode of the pixel arrangement in the compensating sub-areas is not further limited, and is particularly determined according to actual situations.

In some embodiments, the step S109 of determining the compensating parameter of the compensation area includes:

S1091: determining a pixel quantity of the compensation area.

S1092: if the pixel quantity of the compensation area is less than a quantity of brightness-compensation ranks, determining the compensating parameter of the compensation area to be a zero grayscale.

As an example, if the pixel quantity of the compensation area is 5, and the quantity of the brightness-compensation ranks is 6, then all of the compensating parameters of the pixels in the compensation area are set to be a zero grayscale (L0). If the pixel quantity of the compensation area is 4, and the quantity of the brightness-compensation ranks is 5. then all of the compensating parameters of the pixels in the compensation area are set to be a zero grayscale (L0).

In the brightness compensation or the brightness regulation, the process of the brightness regulation is divided into multiple brightness-compensation ranks according to different amplitudes of the brightness regulation, wherein the different brightness-compensation ranks have different levels of the brightness regulation.

If the brightness-compensation energy levels have a higher quantity, that indicates that the process of the brightness regulation on the pixels in the compensation area is more delicate, and the image quality of the displayed frame after the brightness regulation is better. In practical applications, the quantity of the brightness-compensation energy levels is related to the quantity of the pixels contained in the compensation area, which may be regulated particularly according to actual situations, and is not limited herein.

In addition, the quantity of the brightness-compensation energy levels is related to an image-quality-engine processing precision.

For example, regarding a displaying device using the technique of SDR (Standard Dynamic Range), the image-quality-engine processing precision is 8 bits, the grayscales of its frame have $2^8$=256 ranks, i.e., including L0, L1, L2, L3 . . . L254 and L255, and the quantity of the brightness-compensation energy levels may be at most 256.

Regarding a displaying device using the technique of HDR (High-Dynamic Range), the image-quality-engine processing precision is 10 bits, the grayscales of its frame have $2^{10}$1024 ranks, i.e., including L0, L1, L2, L3 . . . L1022 and L1023, and the quantity of the brightness-compensation energy levels may be at most 1024.

It should be noted that the technique of HDR (High-Dynamic Range) is "high" with respect to the technique of SDR (Standard Dynamic Range). Regarding a displaying device using the technique of SDR, the brightness range of the displaying device is 200-300 nits, the contrast is approximately 500:1 to 4000:1, depending on the displaying mode, and the internal image-quality-engine processing precision is 8 bits. However, regarding a displaying device using the technique of HDR1000 (the technique of HDR1000 is one type of the technique of HDR), the brightness requirements on the displaying device include: the ten-percent-center white-color frame requires the brightness to be ≥1000 nits, the side-corner black-state brightness ≤0.05 nits, and the internal image-quality-engine processing precision is 10 bits.

S1093: if the pixel quantity of the compensation area is greater than or equal to the quantity of the brightness-compensation ranks, dividing the compensation area into a plurality of compensating sub-areas, wherein a quantity of the compensating sub-areas is equal to the quantity of the brightness-compensation ranks;

wherein pixels in a same compensating sub-area correspond to a same brightness-compensation rank, the compensating parameters in a same brightness-compensation rank are equal, and the compensating parameters in the brightness-compensation ranks are greater than or equal to a zero grayscale, and less than pixel grayscales of the edge pixels.

In addition, the compensating parameter of one brightness-compensation rank of the multiple brightness-compensation ranks is a zero grayscale, and the compensating parameters of the compensating sub-areas gradually decrease in a first direction, wherein the first direction refers to the direction from the area where the frame pixels are located to the compensation area.

As an example, the compensation area may be delimited into 3, 4, 5, 6 or more compensating sub-areas, wherein the quantity of the compensating sub-areas is equal to the quantity of the brightness-compensation ranks.

It can be understood that, if each of the compensation areas is delimited into more compensating sub-areas, the process of the brightness regulation is more delicate, and the image quality of the frame displayed in the pixel areas after the brightness regulation is better.

As an example, regarding a displaying device using the technique of HDR, its internal image-quality-engine processing precision is 10 bits. the grayscales of its frame have $2^{10}$=1024 ranks, i.e., including L0, L1, L2, L3 . . . L1022 and L1023 grayscales, and the quantity of the brightness-compensation energy levels may be at most 1024. Table 1 provides a compensating-parameter table when the quantity of the brightness-compensation ranks is 6.

When the pixel quantity of the compensation area corresponding to one edge pixel is 27, because the quantity of the brightness-compensation ranks is 6, the compensation area is delimited into 6 compensating sub-areas, 27÷6=4 (the remainder is 3). Accordingly:

TABLE 1 compensating-parameter table of first type of brightness-compensation ranks

| | Ranks | Gray Level |
|---|---|---|
| 10 bits | 5 | L900 |
| | 4 | L700 |
| | 3 | L500 |
| | 2 | L300 |
| | 1 | L100 |
| | 0 | L0 |

The first compensating sub-area contains 4 pixels, the corresponding brightness-compensation energy level is 5, and the corresponding compensating parameter is L900.

The second compensating sub-area contains 4 pixels, the corresponding brightness-compensation energy level is 4, and the corresponding compensating parameter is L700.

The third compensating sub-area contains 4 pixels, the corresponding brightness-compensation energy level is 3, and the corresponding compensating parameter is L500.

The fourth compensating sub-area contains 4 pixels, the corresponding brightness-compensation energy level is 2, and the corresponding compensating parameter is L300.

The fifth compensating sub-area contains 4 pixels, the corresponding brightness-compensation energy level is 1, and the corresponding compensating parameter is L100.

The sixth compensating sub-area contains 4+3 (remainder) pixels, the corresponding brightness-compensation energy level is 0, and the corresponding compensating parameter is L0.

It should be noted that the grayscale corresponding to the lowest brightness-compensation energy level (Rank 0) is the L0 grayscale, the grayscale corresponding to the highest brightness-compensation energy level (Rank 5) is less than the pixel grayscale of the edge pixels, and the grayscales corresponding to the other brightness-compensation energy levels are between the two grayscales, which may be regulated according to actual situations.

TABLE 2 compensating-parameter table of second type of brightness-compensation ranks

| | Ranks | Gray Level |
|---|---|---|
| 8 bits | 4 | L200 |
| | 3 | L150 |
| | 2 | L100 |
| | 1 | L50 |
| | 0 | L0 |

As an example, regarding a displaying device using the technique of SDR, its internal image-quality-engine processing precision is 8 bits, the grayscales of its frame have $2^{8}$=256 ranks, i.e., including L0, L1, L2, L3 . . . L254 and L255 grayscales. and the quantity of the brightness-compensation energy levels may be at most 256. Table 2 provides a compensating-parameter table when the quantity of the brightness-compensation ranks is 5.

When the pixel quantity of the compensation area corresponding to one edge pixel is 27, the compensation area is delimited into 5 compensating sub-areas, 27÷5=5 (the remainder is 2). Accordingly:

The first compensating sub-area contains 5 pixels, the corresponding brightness-compensation energy level is 4, and the corresponding compensating parameter is L200.

The second compensating contains 3 pixels, the corresponding brightness-compensation energy level is 3, and the corresponding compensating parameter is L150.

The third compensating sub-area contains 5 pixels, the corresponding brightness-compensation energy level is 2, and the corresponding compensating parameter is L100.

The fourth compensating sub-area contains 5 pixels, the corresponding brightness-compensation energy level is 1, and the corresponding compensating parameter is L50.

The fifth compensating sub-area contains 5+2 (remainder) pixels, the corresponding brightness-compensation energy level is 0, and the corresponding compensating parameter is L0.

It should be noted that the grayscale corresponding to the lowest brightness-compensation energy level (Rank 0) is the L0 grayscale, the grayscale corresponding to the highest brightness-compensation energy level (Rank 4) is less than the pixel grayscale of the edge pixels, and the grayscales corresponding to the other brightness-compensation energy levels are between the two grayscales, which may be regulated according to actual situations.

In addition, it should be emphasized that, if the pixel quantity of the compensation area is less than the quantity of brightness-compensation ranks, the compensating parameter of the compensation area is determined to be a zero grayscale; in other words, in this case, all of the pixels of the compensation area undergo blackness-insertion processing. If the pixel quantity of the compensation area is greater than or equal to the quantity of the brightness-compensation ranks, regarding the plurality of compensating sub-areas, all of the pixels in the compensating sub-areas corresponding to the brightness-compensation energy level of 0 undergo blackness-insertion processing (L0 grayscale), wherein with the gradual decreasing of the brightness-compensation energy level (the decreasing of the grayscales value), the distances from the corresponding compensating sub-areas to the areas where the frame pixels are located are increasingly larger. Regarding all of the pixels in the compensating sub-areas of the highest brightness-compensation energy level, the grayscale values corresponding to their compensating parameters are less than the grayscale values of the edge pixels.

In practical applications, because an HDR displaying device has higher requirements on the brightness and the image quality, usually, in the brightness regulation on the backlight source of an HDR displaying device, each of the compensation areas may be delimited into compensating sub-areas of a higher quantity, whereby the brightnesses of the compensating sub-areas can be regulated individually, to satisfy the higher requirements on the image quality of the HDR displaying device.

As an example, referring to FIG. 7*b*, if the pixel quantity of the compensation area is greater than or equal to the quantity of the brightness-compensation ranks, the brightness-compensation energy levels corresponding to the compensating sub-areas gradually decrease in the arrow direction shown in FIG. 7*b* (the grayscale values decrease).

In practical applications, the compensation area corresponding to each of the edge pixels includes at least one compensating sub-area, and each of the compensating sub-areas contains at least one pixel. The particular modes of the arrangement of the pixels in the compensating sub-areas may be determined by referring to the quantity of the pixels actually contained in the compensation area and the severity of the halo, and are not limited herein.

The brightness regulating method according to the embodiments of the present disclosure can include, according to the light areas in the lightening state, determining the compensation area; if the pixel quantity of the compensation area is less than the quantity of the brightness-compensation energy levels, directly performing blackness-insertion processing to all of the pixels of the compensation area; and if the pixel quantity of the compensation area is greater than or equal to the quantity of the brightness-compensation energy levels, dividing the compensation area into a plurality of compensating sub-areas, and performing brightness regulation to different extents on the pixels in the compensating sub-areas. Accordingly, the method can further alleviate the halo phenomenon, improve the effect of displaying of the displaying device, and improve the image quality.

Figure 8A:
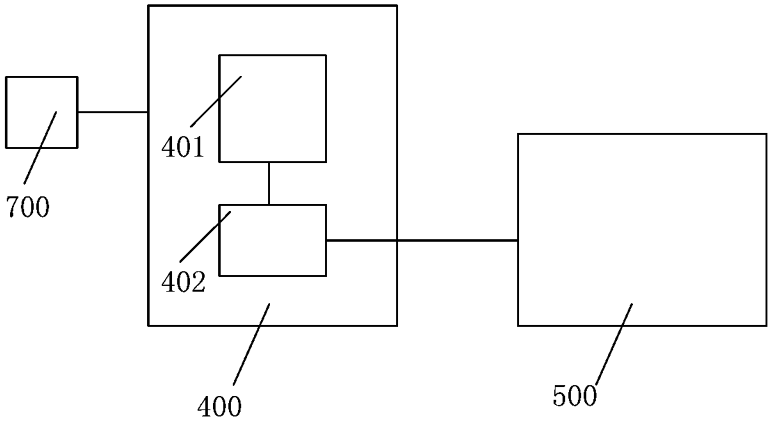
FIG. 8*a* is a schematic structural diagram of a brightness regulating system according to an embodiment of the present disclosure.

An embodiment of the present disclosure provides a brightness regulating system. Referring to FIG. 8*a*, the system includes: a controller 400 and a backlight module 500 that are electrically connected.

The backlight module 500 is configured for providing a backlight source under controlling by the controller 400.

The controller 400 includes an area dividing and light regulating unit 402 and a controlling unit 401. The controlling unit 401 and the area dividing and light regulating unit 402 are electrically connected, and the area dividing and light regulating unit 402 and the backlight module 500 are electrically connected.

The area dividing and light regulating unit 402 is configured for, if an area-delimitation controlling signal emitted by the controlling unit 401 has been received, according to the area-delimitation controlling signal, dividing the backlight source into a plurality of light areas.

The controlling unit 401 is configured for acquiring and storing maximum grayscale values of the light areas and a maximum grayscale value of the backlight source; according to the maximum grayscale values of the light areas and the maximum grayscale value of the backlight source, obtaining first brightness parameters corresponding to the light areas; according to the first brightness parameters, obtaining a second brightness parameter; and emitting the area-delimitation controlling signal and a light regulating signal.

The area dividing and light regulating unit 402 is further configured for, after the light regulating signal has been received, acquiring the second brightness parameter, and according to the second brightness parameter, regulating brightnesses of the light areas.

In an embodiment of the present disclosure, the controller 400 may be a time schedule controller (TCON), the area dividing and light regulating unit 402 may be an LDC (Local dimming controller), and the controlling unit 401 may be an MCU (Microcontroller Unit).

In an embodiment of the present disclosure, the backlight module may be a backlight module of the Mini LED type, and may also be a backlight module of the Micro LED type, which is particularly determined according to actual situations, and is not limited herein.

In an embodiment of the present disclosure, the system further includes a PC motherboard or a video collecting card (Graphics Cards) 700. The PC motherboard or video collecting card 700 may be connected to the controller 400 by an EDP interface, to transmit a video-stream signal to the controller 400. The modules in the controller 400 perform logical operation to the video-stream signal, and transmit the obtained brightness signal to the backlight module 500 via an SPI interface, thereby controlling the brightness of the backlight source of the backlight module. In practical applications, the controller 400 is electrically connected to the backlight module 500 by an LED driver.

It should be noted that the EDP interface is a fully digitalized interface based on the Display Port architecture and protocol, can transmit a high-resolution signal by using a simple connector and a few leads, and can realize transmission of multiple data at a same time. The SPI (Serial Peripheral Interface) is a synchronous serial peripheral interface, and can enable the MCU to communicate with various peripheral devices in a serial manner to exchange information.

The embodiments of the present disclosure include, by using the regulating system, acquiring maximum grayscale values of the light areas and a maximum grayscale value of the backlight source; according to the maximum grayscale values of the light areas and the maximum grayscale value of the backlight source, obtaining a plurality of first brightness parameters; according to the plurality of first brightness parameters, obtaining a second brightness parameter; and subsequently, according to the second brightness parameter and the initial brightnesses of the light areas, regulating brightnesses of the light areas, to reduce the difference in the brightnesses of the pixel areas corresponding to the light areas in the lightening state and the pixel areas corresponding to the light areas in the extinguishing state, which can alleviate the problem of "halo" caused by light leakage of the display panel, and in turn can improve the effect of displaying of the displaying device fabricated by using the backlight module.

In some embodiments of the present disclosure, the area dividing and light regulating unit 402 includes an area dividing subunit and a light regulating subunit.

The area dividing subunit is configured for, according to the area-delimitation controlling signal, dividing the backlight source into a plurality of light areas.

The light regulating subunit is configured for acquiring the second brightness parameter; if a light area among the light areas is in a lightening state, renewing a brightness value of the light area according to the second brightness parameter, wherein the brightness value that has been renewed is equal to a product of multiplying an initial brightness value of the light area in the lightening state by the second brightness parameter; and if a light area among the light areas is in an extinguishing state, controlling the light area to maintain the extinguishing state.

In some embodiments of the present disclosure, the controlling unit 401 includes a storing subunit, an acquiring subunit, a first calculating subunit and a second calculating subunit.

The acquiring subunit is configured for acquiring the maximum grayscale values of the light areas and the maximum grayscale value of the backlight source.

The storing subunit is configured for storing the area-delimitation controlling signal, the light regulating signal, the maximum grayscale values of the light areas, the maximum grayscale value of the backlight source, the first brightness parameter and the second brightness parameter, and emitting the area-delimitation controlling signal and the light regulating signal.

The first calculating subunit is configured for dividing the maximum grayscale values of the light areas by the maximum grayscale value of the backlight source, to obtain a plurality of the first brightness parameters of a quantity equal to a quantity of the light areas.

The second calculating subunit is configured for solving an average value of the first brightness parameters, to obtain the second brightness parameter.

In some embodiments of the present disclosure, the controlling unit 401 further includes a determining submodule.

The determining submodule is configured for determining a third brightness parameter of the light areas, and determining whether the third brightness parameter exceeds a preset value; and if the third brightness parameter exceeds the preset value, the determining submodule triggers the storing submodule to emit the light regulating signal, wherein the third brightness parameter refers to a ratio of an average value of the maximum grayscale values of the light areas to the maximum grayscale value of the backlight source.

In some embodiments of the present disclosure, the preset value is less than or equal to 30%.

Figure 8B:
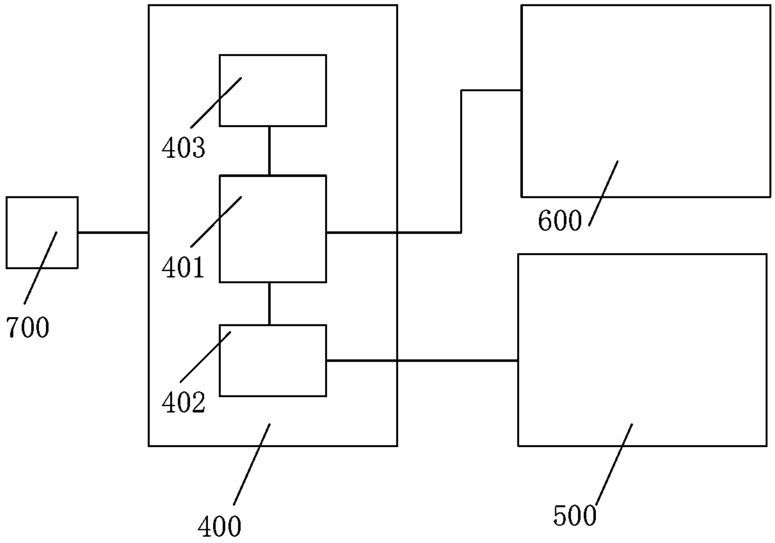
FIG. 8*b* is a schematic structural diagram of another brightness regulating system according to an embodiment of the present disclosure.

In some embodiments of the present disclosure, referring to FIG. 8*b*, the system further includes a display panel 600, the display panel 600 is located on the light exiting side of the backlight module 500, and the display panel 600 is electrically connected to the controlling unit 401. The controller 400 further includes a color compensating unit 403, and the color compensating unit 403 is electrically connected to the controlling unit 401.

The color compensating unit 403 is configured for, according to the light areas in a lightening state, determining a compensation area of the display panel; and determining a compensating parameter of the compensation area. The controlling unit 401 is further configured for, according to the compensating parameter, performing brightness regulation to the compensation area.

The color compensating unit 403 may be an ACC (Accurate Color Capture), which is also referred to as an ACC (Adjust Chromaticity Coordinate).

In practical applications, the color compensating unit 403 may also be used to regulate the brightnesses of the sub-pixels included in the pixels in the pixel areas. Particularly, when a pixel includes a red-color sub-pixel, a green-color sub-pixel and a blue-color sub-pixel, the overall frame color of the display panel may be regulated by regulating the proportion of the brightnesses of the red-color sub-pixel, the green-color sub-pixel and the blue-color sub-pixel.

In an embodiment of the present disclosure, after the modules in the controller 400 has performed the logical operation relevant to the brightness regulation to the video-stream signal, the obtained brightness regulating signal is transmitted to the backlight module 500 via an SPI interface. Particularly, the PC motherboard or video collecting card 700 may be connected to the controller 400 by an EDP interface, to transmit a video-stream signal to the controller 400. The modules in the controller 400 perform logical operation to the video-stream signal, and transmit the brightness regulating signal obtained by the operation to the display panel 600 via an SPI interface, thereby controlling the grayscale values of the pixels of the compensation areas in the display panel. In practical applications, the modules in the controller 400 may perform logical operation to the video-stream signal, and transmit the corresponding signals individually to the backlight module 500 and the display panel 600 via a SPI interface, so as to, while regulating the brightness of the backlight source, regulate the grayscale values of the pixels of the compensation areas in the display panel, thereby, under their combined action, alleviating the halo, and improving the effect of displaying of the displaying device.

In some embodiments of the present disclosure, the color compensating unit 403 includes a first determining subunit and a second determining subunit.

The first determining subunit is configured for determining a displayed frame in the display panel corresponding to the light areas in the lightening state; according to frame pixels in the displayed frame, determining edge pixels; determining a quantity of the frame pixels; and according to the quantity of the frame pixels, determining a compensation area of the edge pixels, wherein the compensation area refers to an area where some of pixels other than the frame pixels among pixels corresponding to the light areas in the lightening state are located.

The second determining subunit is configured for determining a pixel quantity of the compensation area; if the pixel quantity of the compensation area is less than a quantity of brightness-compensation ranks, determining the compensating parameter of the compensation area to be a zero grayscale; and if the pixel quantity of the compensation area is greater than or equal to the quantity of the brightness-compensation ranks, dividing the compensation area into a plurality of compensating sub-areas, wherein a quantity of the compensating sub-areas is equal to the quantity of the brightness-compensation ranks;

wherein pixels in a same compensating sub-area correspond to a same brightness-compensation rank, the compensating parameters in a same brightness-compensation rank are equal, and the compensating parameters in the brightness-compensation ranks are greater than or equal to a zero grayscale, and less than pixel grayscales of the edge pixels.

In some embodiments of the present disclosure, compensating parameters of the compensating sub-areas gradually decrease in a first direction, wherein the first direction refers to a direction from an area where the frame pixels are located to the compensation area.

It should be noted that the process of the brightness regulation by the regulating system may refer to the embodiments of the brightness regulating method, and the repeated parts are not discussed further.

An embodiment of the present disclosure provides a displaying device, wherein the displaying device includes the system stated above.

The displaying device may be any products or components that have the function of displaying, such as a mobile phone, a tablet personal computer, a television set, a display, a notebook computer, a digital photo frame and a navigator and so on. All of the other indispensable components of the displaying device are used, as understood by a person skilled in the art, which is not discussed herein further, and should not be used as a limitation on the present disclosure. The process of the brightness regulation by the displaying device may refer to the above particular description on the regulating system or refer to the embodiments of the brightness regulating method, and the repeated parts are not discussed further.

The above are merely particular embodiments of the present disclosure, and the protection scope of the present disclosure is not limited thereto. All of the variations or substitutions that a person skilled in the art can easily envisage within the technical scope disclosed by the present disclosure should fall within the protection scope of the present disclosure. Therefore, the protection scope of the present disclosure should be subject to the protection scope of the claims.

The invention claimed is:

1. A brightness regulating method, wherein the method is applied to a displaying device, the displaying device comprises a backlight module, and the brightness regulating method comprises:

dividing a backlight source of the backlight module into a plurality of light areas;

acquiring maximum grayscale values of the light areas and a maximum grayscale value of the backlight source;

according to the maximum grayscale values of the light areas and the maximum grayscale value of the backlight source, obtaining first brightness parameters of the light areas;

according to the first brightness parameters, obtaining a second brightness parameter; and according to the second brightness parameter, regulating brightnesses of the light areas, wherein the step of, according to the second brightness parameter, regulating the brightnesses of the light areas comprises:

when a light area among the light areas is in a lightening state, renewing a brightness value of the light area, wherein the brightness value that has been renewed is equal to a product of multiplying an initial brightness value of the light area in the lightening state by the second brightness parameter; and when a light area among the light areas is in an extinguishing state, maintaining the extinguishing state of the light area.

2. The brightness regulating method according to claim 1, wherein the step of, according to the maximum grayscale values of the light areas and the maximum grayscale value of the backlight source, obtaining the first brightness parameters of the light areas comprises:

dividing the maximum grayscale values of the light areas by the maximum grayscale value of the backlight source, to obtain a plurality of the first brightness parameters of a quantity equal to a quantity of the light areas.

3. The brightness regulating method according to claim 1, wherein the step of, according to the first brightness parameters, obtaining the second brightness parameter comprises:

solving an average value of the first brightness parameters, to obtain the second brightness parameter.

4. The brightness regulating method according to claim 1, wherein after the step of dividing the backlight source into the plurality of light areas, the method further comprises:

determining a third brightness parameter of the light areas; and when the third brightness parameter exceeds a preset value, regulating the brightnesses of the light areas.

5. The brightness regulating method according to claim 4, wherein the step of determining the third brightness parameter of the light areas comprises:

according to the maximum grayscale values of the light areas, obtaining an average value of the maximum grayscale values of the light areas; and according to the average value of the maximum grayscale values of the light areas and the maximum grayscale value of the backlight source, determining the third brightness parameter.

6. The brightness regulating method according to claim 4, wherein the preset value is less than or equal to 30%.

7. The brightness regulating method according to claim 1, wherein the displaying device further comprises a display panel, and the display panel is located on a light exiting side of the backlight module; and after the step of, according to the second brightness parameter, regulating the brightness of the light areas, the method further comprises:

according to the light areas in a lightening state, determining a compensation area of the display panel;

determining a compensating parameter of the compensation area; and according to the compensating parameter, performing brightness regulation to the compensation area.

8. The brightness regulating method according to claim 7, wherein the step of, according to the light areas in the lightening state, determining the compensation area comprises:

determining a displayed frame in the display panel corresponding to the light areas in the lightening state;

according to frame pixels in the displayed frame, determining edge pixels;

determining a quantity of the frame pixels; and according to the quantity of the frame pixels, determining a compensation area of the edge pixels, wherein the compensation area refers to an area where some of pixels other than the frame pixels among pixels corresponding to the light areas in the lightening state are located.

9. The brightness regulating method according to claim 7, wherein the step of determining the compensating parameter of the compensation area comprises:

determining a pixel quantity of the compensation area;

when the pixel quantity of the compensation area is less than a quantity of brightness-compensation ranks, determining the compensating parameter of the compensation area to be a zero grayscale; and when the pixel quantity of the compensation area is greater than or equal to the quantity of the brightness-compensation ranks, dividing the compensation area into a plurality of compensating sub-areas, wherein a quantity of the compensating sub-areas is equal to the quantity of the brightness-compensation ranks;

wherein pixels in a same compensating sub-area correspond to a same brightness-compensation rank, the compensating parameters in a same brightness-compensation rank are equal, and the compensating parameters in the brightness-compensation ranks are greater than or equal to a zero grayscale, and less than pixel grayscales of the edge pixels.

10. The brightness regulating method according to claim 9, wherein compensating parameters of the compensating sub-areas gradually decrease in a first direction, wherein the first direction refers to a direction from an area where the frame pixels are located to the compensation area.

11. A brightness regulating system, wherein the brightness regulating system comprises: a controller and a backlight module that are electrically connected; and the controller is configured to perform:

dividing a backlight source of the backlight module into a plurality of light areas;

acquiring maximum grayscale values of the light areas and a maximum grayscale value of the backlight source;

according to the maximum grayscale values of the light areas and the maximum grayscale value of the backlight source, obtaining first brightness parameters of the light areas;

according to the first brightness parameters, obtaining a second brightness parameter; and according to the second brightness parameter, regulating brightnesses of the light areas, wherein the step of, according to the second brightness parameter, regulating the brightnesses of the light areas comprises:

when a light area among the light areas is in a lightening state, renewing a brightness value of the light area, wherein the brightness value that has been renewed is equal to a product of multiplying an initial brightness value of the light area in the lightening state by the second brightness parameter; and when a light area among the light areas is in an extinguishing state, maintaining the extinguishing state of the light area.

12. The system according to claim 11, wherein the controller is further configured to perform:

dividing the maximum grayscale values of the light areas by the maximum grayscale value of the backlight source, to obtain a plurality of the first brightness parameters of a quantity equal to a quantity of the light areas; and solving an average value of the first brightness parameters, to obtain the second brightness parameter.

13. The system according to claim 12, wherein, after the step of dividing the backlight source into the plurality of light areas, the controller is further configured to perform:

determining a third brightness parameter of the light areas; and when the third brightness parameter exceeds a preset value, regulating the brightnesses of the light areas.

14. The system according to claim 13, wherein the preset value is less than or equal to 30%.

15. The system according to claim 11, wherein the system further comprises a display panel, the display panel is located on a light exiting side of the backlight module, and after the step of, according to the second brightness parameter, regulating the brightness of the light areas, the controller is further configured to perform:

according to the light areas in a lightening state, determining a compensation area of the display panel;

determining a compensating parameter of the compensation area; and according to the compensating parameter, performing brightness regulation to the compensation area.

16. The system according to claim 15, wherein the controller is further configured to perform:

determining a displayed frame in the display panel corresponding to the light areas in the lightening state;

according to frame pixels in the displayed frame, determining edge pixels;

determining a quantity of the frame pixels; and according to the quantity of the frame pixels, determining a compensation area of the edge pixels, wherein the compensation area refers to an area where some of pixels other than the frame pixels among pixels corresponding to the light areas in the lightening state are located; and the controller is further configured to perform:

determining a pixel quantity of the compensation area;

when the pixel quantity of the compensation area is less than a quantity of brightness-compensation ranks, determining the compensating parameter of the compensation area to be a zero grayscale; and when the pixel quantity of the compensation area is greater than or equal to the quantity of the brightness-compensation ranks, dividing the compensation area into a plurality of compensating sub-areas, wherein a quantity of the compensating sub-areas is equal to the quantity of the brightness-compensation ranks;

wherein pixels in a same compensating sub-area correspond to a same brightness-compensation rank, the compensating parameters in a same brightness-compensation rank are equal, and the compensating parameters in the brightness-compensation ranks are greater than or equal to a zero grayscale, and less than pixel grayscales of the edge pixels.

17. The system according to claim 16, wherein compensating parameters of the compensating sub-areas gradually decrease in a first direction, wherein the first direction refers to a direction from an area where the frame pixels are located to the compensation area.

18. A displaying device, wherein the displaying device comprises the system according to claim 11.

* * * * *